United States Patent
Singh et al.

(10) Patent No.: US 6,660,184 B2
(45) Date of Patent: Dec. 9, 2003

(54) PHOSPHOR PASTE COMPOSITIONS

(75) Inventors: Raj P. Singh, Sayre, PA (US); Robert G. Mendenhall, Waverly, NY (US); Diane C. Seymour, Towanda, PA (US)

(73) Assignee: Osram Sylvania Inc., Danvers, MA (US)

(*) Notice: Subject to any disclaimer, the term of this patent is extended or adjusted under 35 U.S.C. 154(b) by 64 days.

(21) Appl. No.: 10/021,919

(22) Filed: Dec. 13, 2001

(65) Prior Publication Data
US 2003/0111642 A1 Jun. 19, 2003

(51) Int. Cl.$^7$ .............................................. C09K 11/02
(52) U.S. Cl. ..................... 252/301.35; 427/64; 427/66; 427/67; 427/68; 427/152; 252/301.4 R; 252/301.6 F
(58) Field of Search ................ 252/301.35, 301.4 R, 252/301.4 S, 301.4 F, 301.4 H, 301.4 P, 301.5, 301.6 R, 301.6 S, 301.6 P, 301.6 F; 427/44, 67, 68, 66, 157

(56) References Cited

U.S. PATENT DOCUMENTS

| 4,780,376 | A | * | 10/1988 | Nakamura | 428/691 |
|---|---|---|---|---|---|
| 5,340,661 | A | * | 8/1994 | Van Havenbergh et al. | 428/690 |
| 5,741,840 | A | | 4/1998 | Lindquist et al. | 313/581 |
| 5,851,732 | A | | 12/1998 | Kanda et al. | 430/321 |
| 5,909,083 | A | | 6/1999 | Asano et al. | 313/584 |
| 5,952,036 | A | | 9/1999 | Tadaki et al. | 427/64 |
| 6,008,582 | A | | 12/1999 | Asano et al. | 313/582 |
| 6,043,604 | A | | 3/2000 | Horiuchi et al. | 313/582 |
| 6,075,319 | A | | 6/2000 | Kanda et al. | 313/584 |
| 6,120,975 | A | | 9/2000 | Tokai et al. | 430/321 |
| 6,156,141 | A | | 12/2000 | Shirakawa | 156/67 |
| 6,184,621 | B1 | | 2/2001 | Horiuchi et al. | 313/586 |
| 6,271,161 | B1 | | 8/2001 | Ryu et al. | 501/76 |

OTHER PUBLICATIONS

Abstract, JP2000104055, Toda et al. (Apr. 11, 2000).
Abstract, JP2000208055, Kobayashi et al. (Jul. 28, 2000).
Abstract, JP2001081450, Kobayshi et al. (Mar. 27, 2001).
Abstract, JP2000104053, Toda et al. (Apr. 11, 2000).

* cited by examiner

Primary Examiner—C. Melissa Koslow
(74) Attorney, Agent, or Firm—Robert F. Clark

(57) ABSTRACT

A phosphor paste composition for plasma display panels (PDP) is provided which comprises a phosphor dispersed in an organic paste comprising a solvent, a binder, at least one dispersant comprising stearic acid, and a plasticizer. The paste compositions are very stable and have desirable screen-printing properties. In addition, the phosphor contained in the paste retains a high percentage of its initial brightness following binder burn-out.

20 Claims, 3 Drawing Sheets

PHOSPHOR PASTE COMPOSITIONS

TECHNICAL FIELD

This invention relates to phosphor pastes used in the manufacture of plasma display panels (PDP). More particularly, this invention relates to the brightness maintenance of phosphor pastes after binder burn-out.

BACKGROUND ART

There exists tremendous market potential for plasma display panels for both home entertainment and computer applications. In order to succeed in these markets, plasma display panels must meet or exceed the performance of standard cathode ray tubes (CRT). As with cathode ray tubes, the performance of the plasma display panels center on the performance of the phosphors which make up the displays and their methods of application.

In the manufacture of PDP panels, the phosphors are applied to an inner panel surface by screen-printing patterns of pastes containing red, green, and/or blue-emitting phosphors. Typical PDP phosphors include the red-emitting $(Y,Gd)BO_3$:Eu phosphor, the blue-emitting $BaMgAl_{14}O_{23}$:$Eu^{2+}$ phosphor, and the green-emitting $Zn_2SiO_4$:Mn phosphor. Paste characteristics such as viscosity, print thickness, thixotropy, surface tension, and binder burn-out have an effect on the screen-printing ability of the phosphor-containing pastes and the overall quality of the plasma display panel. In addition the phosphor, PDP paste compositions typically include a binder, an organic solvent, dispersants and plasticizers. The phosphor generally comprises from about 35 to about 65 percent by weight of the paste. Prior art binders include ethyl cellulose and polymethyl methacrylate. The amount of the binder in a paste may vary from about 0.5 to about 10% by weight. The dispersant is important for the paste stability, i.e., maintaining a homogeneous suspension of phosphor particles in the paste for long duration of time without separation of the solids. Typical viscosity requirements for PDP pastes range from about 30,000 to 60,000 centipoise.

Pastes should be formulated to minimize any negative effects on phosphor brightness during panel manufacturing. In particular, the organic components of the pastes are burned-out during panel manufacturing by heating the panels to about 500° C. in an oxygen-containing atmosphere for about 1–2 hours. This burn-out step can severely impact the brightness of the PDP phosphors. Particularly, those phosphors which contain activator ions susceptible to oxidation, e.g., $BaMgAl_{14}O_{23}$:$Eu^{2+}$. A typical brightness loss for this blue-emitting PDP phosphor can be greater than 20% following burn-out.

SUMMARY OF THE INVENTION

It is an object of the present invention to minimize the decrease in the brightness of PDP phosphors resulting from the burn-out of the organic paste components.

It is another object of the invention to provide pastes which are capable of being used in the screen-printing of plasma display panels.

It is yet another object of the invention to provide pastes of blue, red and green PDP phosphors with improved paste stability.

In accordance with an object of the invention, there is provided a phosphor paste for plasma display panels comprising a phosphor dispersed in an organic paste comprising a solvent, a binder, at least one dispersant comprising stearic acid, and a plasticizer.

In accordance with another object of the invention, there is provided a phosphor paste for plasma display panels comprising a phosphor dispersed in an organic paste containing a binder and stearic acid, said phosphor retaining at least about 90% of its initial brightness after said binder has been burned-out.

DETAILED DESCRIPTION OF THE INVENTION

Figure 1:
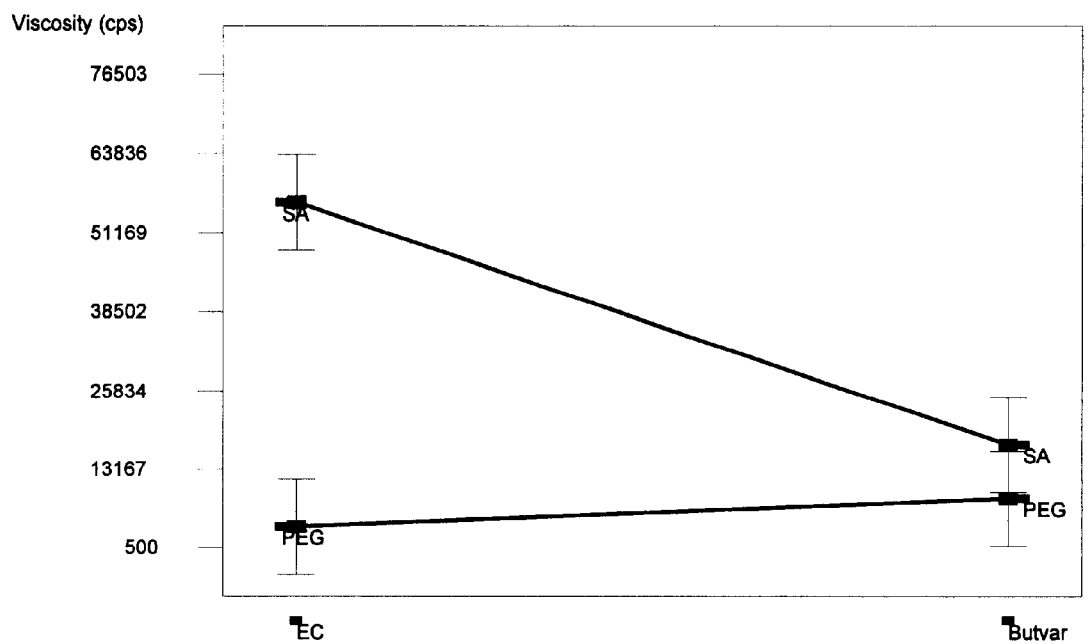
FIG. 1 is an interaction plot of the effect of the binder and dispersant on the viscosity of pastes.

In general, the PDP phosphor paste s of this invention are made by forming a dispersion of a phosphor powder in an organic mixture comprising a binder, a solvent, a plasticizer and one or more dispersants wherein at least one of the dispersants is stearic acid. It has been discovered that the stearic acid dispersant is a key component to improving the stability and brightness maintenance of PDP paste compositions. When stearic acid is used in combination with a polyvinyl butyral binder, a paste having excellent stability and brightness maintenance is obtained. Preferably, the percentage of phosphor brightness retained after binder burn-out is at least about 90%.

In a preferred method, the phosphor, a solvent, and one or more dispersants including at least stearic acid are combined. These components are mixed for a time sufficient to form a uniform dispersion of the phosphor particles, typically 1–2 hours. A plasticizer and binder are then added to the phosphor dispersion and additional mixing is used to form the paste, approximately another 1–2 hours. Preferred PDP phosphors for use in the PDP phosphor pastes of this invention include $(Y,Gd)BO_3$:Eu (red), $BaMgAl_{14}O_{23}$:$Eu^{2+}$ (blue), and $Zn_2SiO_4$:Mn (green). Useful solvents include alcohols such as α-terpineol and isobutyl alcohol with α-terpineol being the preferred solvent. In addition to stearic acid, other useful dispersants may include Menhaden fish oil, glyceryl trioleate, and/or polyethylene glycol. The plasticizer is preferably a phthalate and more preferably diisobutyl phthalate. The preferred paste binders are polyvinyl butyral and/or ethyl cellulose. More preferably, the binder is a single component binder consisting of polyvinyl butyral. The weight ratio of stearic acid to binder is preferably from about 1:1 to about 1:2.5. More preferably, the weight ratio is about 1:2.5.

The following non-limiting examples are presented.

EXAMPLES

In a 600 ml beaker, 150–200 g of a blue-emitting PDP phosphor, $BaMgAl_{14}O_{23}$:$Eu^{2+}$, was mixed with 25–50 g of solvent (α-terpineol or isobutyl alcohol), 5–10 g of Menhaden fish oil, and 4–6 g of dispersant (stearic acid or polyethylene glycol) which had been previously dissolved in 16–20 g of the same solvent. These materials were then mixed for 1–2 hours to form a dispersion of the phosphor. After that, 4–6 g of a diisobutyl phthalate plasticizer and 5–15 g of a binder (ethyl cellulose or polyvinyl butyral) were added; the binder having been first dissolved in 25–35 g of the solvent. The paste was then mixed for an additional 1–2 hours. Pastes were stored in plastic containers with sealed caps. Viscosity was measured using a Brookfield RV Torque, DV-III Model Rheometer at 20 rpm. For binder burn-out, 8 g of paste was placed in a glass dish and heated in air at 20 SCFH in a box furnace according to the following program:

Heat at 10° C./min to 110° C.

Heat for 1 hour at 110° C.

Heat at 10° C./min to 500° C.

Heat for 1 hour at 500° C.

The brightness of the phosphor powders was measured before and after the binder burn-out and reported in Table 1 as percent retained brightness (relative to the brightness of the original phosphor). It should be noted that when the paste was burned in the absence of air the brightness of the phosphor was lower and its color shifted. Paste stability was determined by visually observing the degree to which the phosphor solids became separated from the organic media after the paste had been allowed to stand for a period of time. A paste was deemed to have excellent stability if there was no visible separation of the solids from the organic media after the paste stood for at least 4 months. A paste was considered to have good stability if there was little or no separation of the solids from the organic media after the paste was allowed to stand for at least 2 weeks. Even if there was some visible separation in the top portion of the paste, the stability of the paste was still considered to be good if the solids could be mixed back into the paste by roll-milling for 1–2 hours. A paste was deemed to be unstable if the solids separated from the organic media after standing for only 1–2 days. Typically, the solids in an unstable paste could not be mixed back into the paste by roll milling. The results are presented in Table 1 for duplicate samples of each paste composition.

TABLE 1

| Example | Binder | Dispersant | Solvent | % Brightness Retained after Binder Burn-out | Viscosity (cps) | Stability |
|---|---|---|---|---|---|---|
| 1-1 | Butvar | SA | Terpineol | 89.9 | 36330 | Excellent |
| 1-2 | Butvar | SA | Terpineol | 89.9 | 27090 | Excellent |
| 2-1 | EC | SA | Terpineol | 89.6 | 76503 | Good |
| 2-2 | EC | SA | Terpineol | 89.1 | 56803 | Good |
| 3-1 | EC | SA | IBA | 84.4 | 29680 | Good |
| 3-2 | EC | SA | IBA | 83.9 | 61000 | Good |
| 4-1 | Butvar | SA | IBA | 80 | 2100 | Good |
| 4-2 | Butvar | SA | IBA | 80.5 | 2943 | Good |
| 5-1 | EC | PEG | Terpineol | 87.6 | 7200 | Good |
| 5-2 | EC | PEG | Terpineol | 84.5 | 7200 | Good |
| 6-1 | Butvar | PEG | Terpineol | 83.9 | 20843 | Good |
| 6-2 | Butvar | PEG | Terpineol | 84.7 | 9660 | Good |
| 7-1 | BC | PEG | IBA | 85 | 500 | Unstable |
| 7-2 | EC | PEG | IBA | 82.1 | 500 | Unstable |
| 8-1 | Butvar | PEG | IBA | 78.2 | 1330 | Good |
| 8-2 | Butvar | PEG | IBA | 77.6 | 1606 | Good |

KEY FOR TABLE 1
EC = ethyl cellulose
Butvar = polyvinyl butyral
SA = stearic acid
PEG = polyethylene glycol
IBA = isobutyl alcohol A preferred paste composition, which maintained about 90% brightness of the blue PDP phosphor, $BaMgAl_{14}O_{23}:Eu^{2+}$, had the following composition: 150–200 g phosphor, 25–50 g α-terpineol, 5–10 g Menhaden fish oil, 4–5 g stearic acid (dissolved in 16–20 g α-terpineol), 4–6 g diisobutyl phthalate and 5–15 g polyvinyl butyral (dissolved in 25–35 g α-terpineol). In fact most of the observed decrease in phosphor brightness after binder burn-out was the typical 8 to 9% brightness loss caused by the heating of phosphor powder alone. The presence of the organic compounds caused very little additional decrease in the brightness. These results are substantially better than the typical 20–25% decrease in the brightness of the blue PDP phosphor following binder burn-out. For example, the measured decrease in the brightness of a commercial blue PDP paste after binder burn-out was about 17.6%. The above paste composition was also found to produce excellent results for the red PDP phosphor, $(Y,Gd)BO_3:Eu$, and the green PDP phosphor, $Zn_2SiO_4:Mn$. In both cases, the phosphors retained more than 90% of their initial brightness after binder burn-out.

In the present invention, the stearic acid which acts as a low molecular weight dispersant imparts increased viscosity and stability to the paste in comparison to the conventional polyethylene glycol (PEG) dispersant. FIG. 1 is an interaction plot of the effect of the binder and dispersant on the viscosity of PDP pastes. As can be seen, stearic acid (SA) has a great influence on the viscosity. This is particularly evident for the ethyl cellulose (EC) binder as compared to the polyvinyl butyral (Butvar) binder.

Figure 2:
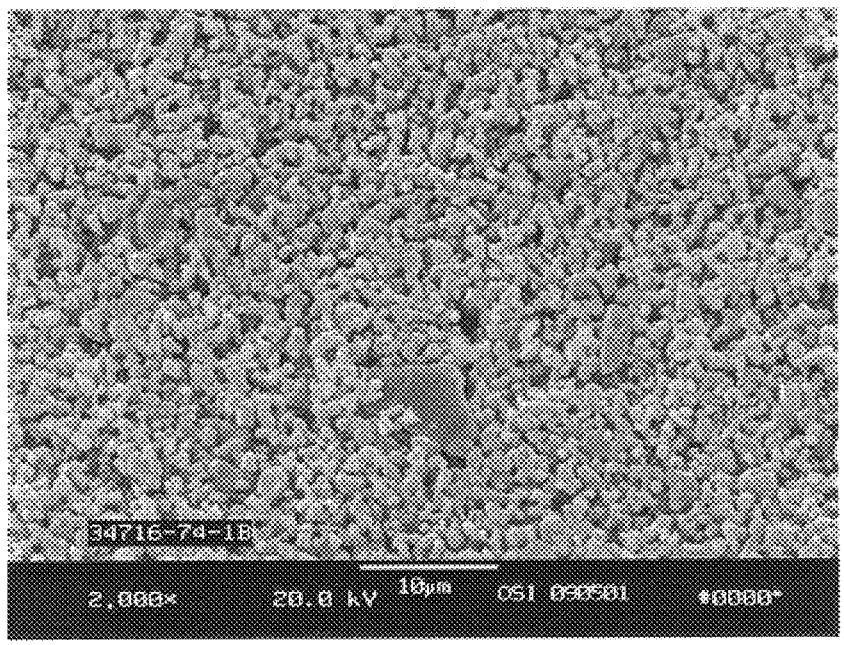
FIG. 2 is an SEM photomicrograph of a screen-printed coating of a blue PDP phosphor paste of this invention after binder burn-out.
Figure 3:
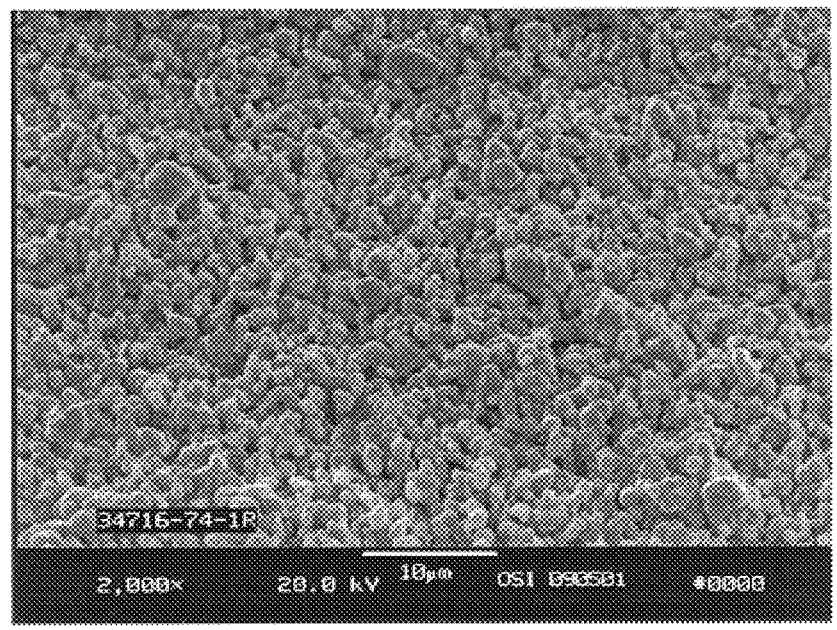
FIG. 3 is an SEM photomicrograph of a screen-printed coating of a red PDP phosphor paste of this invention after binder burn-out.
Figure 4:
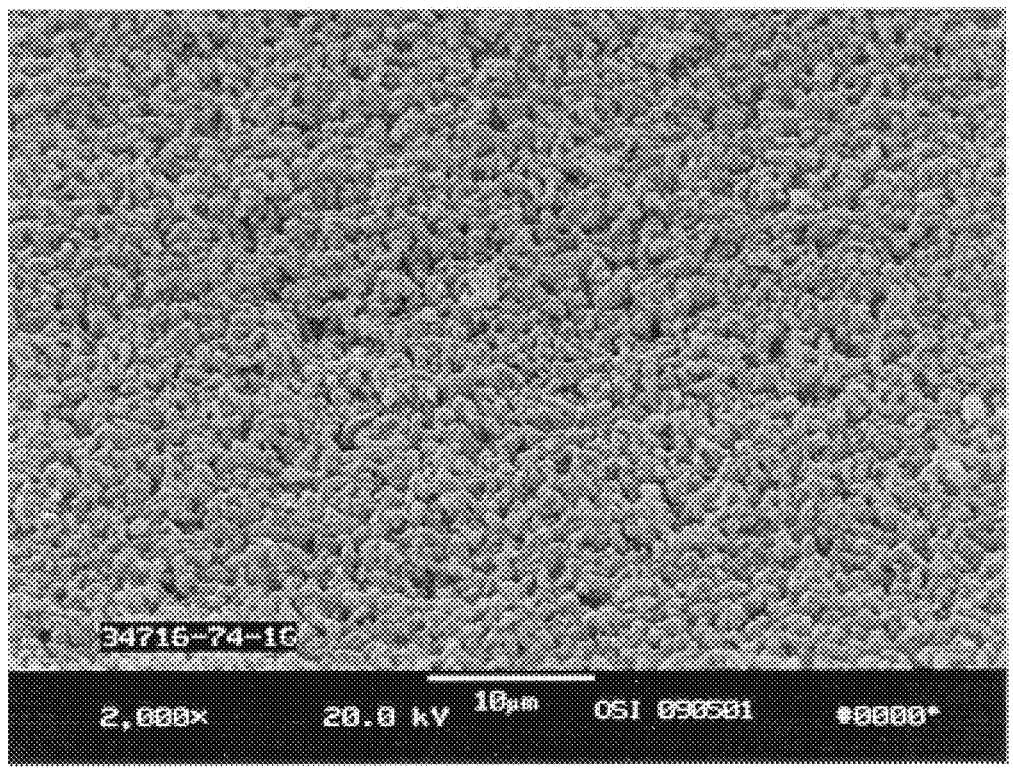
FIG. 4 is an SEM photomicrograph of a screen-printed coating of a green PDP phosphor paste of this invention after binder burn-out.

FIG. 2 is a photomicrograph taken with a scanning electron microscope (SEM) of a coating of the PDP blue phosphor (Example 1) after screen printing and binder burn-out. As can be seen the coating of phosphor was very homogeneous and stable. FIGS. 3 and 4 are similar photomicrographs of coatings of red and green PDP phosphors, respectively, after screen printing binder burn-out. Again, the phosphor coatings made using the pastes of this invention were very homogeneous and stable.

While there has been shown and described what are at the present considered the preferred embodiments of the invention, it will be obvious to those skilled in the art that various changes and modifications may be made therein without departing from the scope of the invention as defined by the appended claims.

We claim:

1. A phosphor paste for plasma display panels comprising a phosphor dispersed in an organic paste comprising polyvinyl butyral, stearic acid, an alcohol solvent, a phthalate, Menhaden fish oil, glyceryl trioleate, and/or polyethylene glycol.

2. The phosphor paste of claim 1 wherein the alcohol solvent is α-terpineol or isobutyl alcohol.

3. The phosphor paste of claim 2 wherein the weight ratio of stearic acid to polyvinyl butyral is about 1:2.5.

4. The phosphor paste of claim 3 wherein the phosphor is $BaMgAl_{14}O_{23}:Eu^{2+}$.

5. The phosphor paste of claim 1 wherein the phthalate is diisobutyl phthalate and the weight ratio of stearic acid to polyvinyl butyral is from about 1:1 to about 1:2.5.

6. The phosphor paste of claim 1 wherein the phosphor is selected from $BaMgAl_{14}O_{23}:Eu^{2+}$, $(Y,Gd)BO_3:Eu$, or $Zn_2SiO_4:Mn$.

7. The phosphor paste of claim 1 wherein the phosphor is $BaMgAl_{14}O_{23}:Eu^{2+}$.

8. A phosphor paste for plasma display panels comprising a phosphor dispersed in an organic paste containing a binder and stearic acid, said phosphor retaining at least about 90% of its initial brightness after said binder has been burned-out.

9. The phosphor paste of claim 8 wherein the phosphor is $BaMgAl_{14}O_{23}:Eu^{2+}$.

10. The phosphor paste of claim 8, wherein the binder is polyvinyl butyral.

11. The phosphor paste of claim 10 wherein the phosphor is selected from $BaMgAl_{14}O_{23}:Eu^{2+}$, $(Y,Gd)BO_3:Eu$, or $Zn_2SiO_4:Mn$.

12. The phosphor paste of claim 10 wherein the phosphor is $BaMgAl_{14}O_{23}:Eu^{2+}$.

13. The phosphor paste of claim 8 wherein the binder is ethyl cellulose.

14. The phosphor paste of claim 3 wherein the paste further contains diisobutyl phthalate.

15. The phosphor paste of claim 14 wherein the phosphor is selected from $BaMgAl_{14}O_{23}:Eu^{2+}$, $(Y,Gd)BO_3:Eu$, or $Zn_2SiO_4:Mn$.

16. The phosphor paste of claim 14 the phosphor is $BaMgAl_{14}O_{23}:Eu^{2+}$.

17. A phosphor paste for plasma display panels comprising a phosphor dispersed in an organic paste comprising a solvent, a binder, at least one dispersant comprising stearic acid, and a plasticizer; and wherein the phosphor is selected from $BaMgAl_{14}O_{23}:Eu^{2+}$, $(Y,Gd)BO_3:Eu$, or $Zn_2SiO_4:Mn$.

18. The phosphor paste of claim 17 wherein the binder is ethyl cellulose.

19. The phosphor paste of claim 18 wherein the plasticizer is diisobutyl phthalate.

20. The phosphor paste of claim 17 wherein the weight ratio of stearic acid to binder is from about 1:1 to about 1:2.5.

* * * * *